S. S. AYERS.
Churn.
No. 62,804.
Patented March 12, 1867.
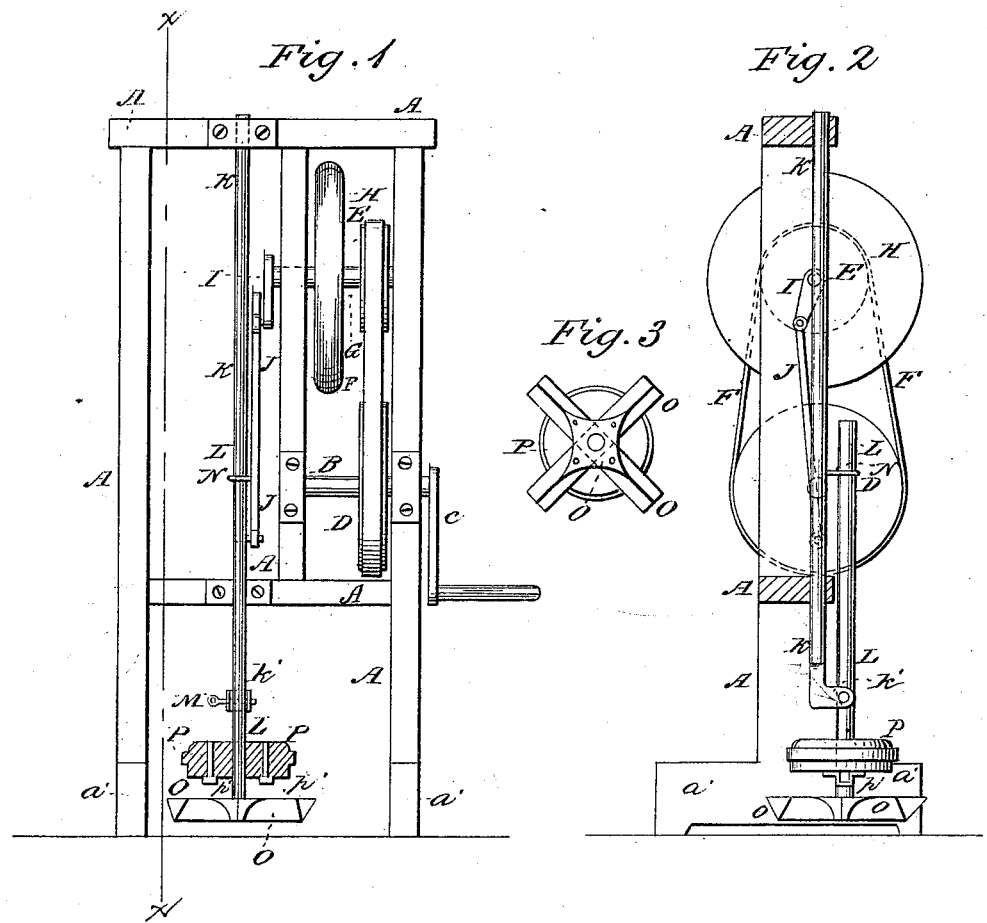

United States Patent Office.

SAMUEL S. AYERS, OF PLAINFIELD, NEW JERSEY.

Letters Patent No. 62,804, dated March 12, 1867.

IMPROVEMENT IN CHURNS.

The Schedule referred to in these Letters Patent and making part of the same.

TO ALL WHOM IT MAY CONCERN:

Be it known that I, SAMUEL S. AYERS, of Plainfield, in the county of Union, and State of New Jersey, have invented a new and useful Improvement in Churns; and I do hereby declare that the following is a full, clear, and exact description thereof, which will enable those skilled in the art to make and use the same, reference being had to the accompanying drawings, forming part of this specification, in which—

Figure 1 is a side view of my improved apparatus.

Figure 2 is a vertical section of the same taken through the line $x\,x$, fig. 1.

Figure 3 is a detail view of the bottom of the dasher.

Similar letters of reference indicate corresponding parts.

My invention has for its object to furnish an improved apparatus simple in construction, and by means of which a small amount of power may be required to perform the churning. And it consists in the combination and arrangement of the dasher, churn lid, pitman, crank, fly-wheel, pulleys, and band or equivalent, and crank with each other, as hereinafter more fully described.

A is the frame, to which the operating parts of the apparatus are attached. The upper and lower ends of the frame A may be attached to the floor and ceiling of the room in which the churning is to be done, or it may be provided with feet $a'$, so as to be movable. B is a horizontal shaft, revolving in bearings in the frame A, to the outer end of which is attached the crank C, by which motion is imparted to the apparatus. D is a pulley, attached to the shaft B, and which communicates motion to the pulley E, by means of the band F. If desired, the pulleys D and E, and band F, may be replaced by gear-wheels. The pulley E is attached to the shaft G, which revolves in bearings in the frame A, as shown in fig. 1. H is a fly-wheel, attached to the shaft G, to give steadiness to the motion of the apparatus. I is a crank, attached to the inner end of the shaft G, as shown in fig 1. J is a pitman, the upper end of which is pivoted to the crank I, and its lower end to the vertical guide-rod K. This guide-rod moves up and down in bearings attached to or formed in the frame A as it is operated by the crank I and pitman J. Upon the lower end of the rod K are formed or to it are attached ears, $k'$, extending out laterally from said rod, between the ends of which the dasher handle L is secured by a pin, M, passing through the said ears and through the handle, as shown in fig. 1. The upper end of the dasher handle L passes up through the guide-ring N; and both the ears $k'$ and guide-ring N extend out so far from the guide-rod K, that the dasher handle L may pass up outside of the frame A, as shown in figs. 1 and 2. O is the dasher, which is attached to the lower end of the dasher handle L. The wings or arms of the dasher are made triangular in shape, as shown in figs. 1, 2, and 3, and are secured to the dasher handle L in such a position that the angle shall be downward and the flat side upward, so as to pass easily through the milk in its downward movement, and in its upward movement, to lift the milk, so that the air may be mingled with it. One or more vertical holes may, if desired, be formed through each of the dasher-arms to promote the agitation of the milk. P is the lid or cover of the churn, which is made with holes through it for the passage of air to the milk. The inner orifices of these holes are covered with caps, $p'$, as shown in figs. 1 and 2, so as to prevent the milk spattering through during the operation of churning, and at the same time allowing a free circulation of air.

I claim as new, and desire to secure by Letters Patent—

The combination and arrangement of the dasher O, churn lid or cover P, dasher handle L, guide-rod K, pitman J, crank I, fly-wheel H, pulleys and band E D F, or equivalent, and crank C, with each other, substantially as herein shown and described and for the purpose set forth.

SAMUEL S. AYERS.

Witnesses:
H. P. BRONK,
T. C. LELAND.